United States Patent [19]
Bergler et al.

[11] Patent Number: 5,461,620
[45] Date of Patent: Oct. 24, 1995

[54] METHOD AND APPARATUS FOR HIGH-SPEED DATA EXCHANGE

[75] Inventors: Frank Bergler, Niefern; Uwe Käuffert, Pforzheim, both of Germany

[73] Assignee: Alcatel N.V., Amsterdam, Netherlands

[21] Appl. No.: 97,375

[22] Filed: Jul. 23, 1993

[30] Foreign Application Priority Data

Aug. 8, 1992 [DE] Germany .................. 42 26 332.8

[51] Int. Cl.$^6$ ................................ H04J 3/12
[52] U.S. Cl. ............... 370/84; 370/85.7; 370/110.1; 375/216
[58] Field of Search .............. 370/29, 77, 110.1, 370/111, 84, 85.7, 95.1; 375/5, 216

[56] References Cited

U.S. PATENT DOCUMENTS

| | | | |
|---|---|---|---|
| 5,214,650 | 5/1993 | Renner et al. | 370/110.1 |
| 5,289,579 | 2/1994 | Punj | 370/110.1 |
| 5,303,239 | 4/1994 | Aoki et al. | 370/110.1 |

FOREIGN PATENT DOCUMENTS 0417788  3/1991  European Pat. Off. .

OTHER PUBLICATIONS

Titan Téléphone Pour Installation Terminale l'Abonné Numérique, *Commutation & Transmission*, Bd. 11, No. 1, 1989, pp. 6–82, Paris, France.
Bewegtbildübertragung als Renner, *Nachrichten Elektronik und Telematik*, Bd. 42, No. 10, Oct. 1988, pp. 410–414, Heidelberg, Germany.
Development with ISDN Terminal Adaptor Compatible with CCITT V. 110 and V.120 Rate Adaptations, *NEC Research and Development*, Bd. 32, No. 2, Apr. 1991, pp. 262–269, Tokyo, Japan.
Interfaces in ISDN, *Review of the Electrical Communication Laboratories*, Bd. 35, No. 5, Sep. 1987 pp. 479–486, Tokyo, Japan.
Ein HICOM-Kraftpaket, *Telcom Report*, BD. 15, No. 1, Jan. 1992, pp. 26–27, Munich, Germany.
(PABX–Host–Coupling: "Computer Integrated Telephone (CIT)" (Computer Inside the Telephony Line), Radio Show 16/19, p. 55–58).
(ISDN–Terminals Experience Report; "The PC as an Extra–Feature–Telephone and More" Radio Show 26/1989, pp. 31–34).
Takashi, Sigimura: u.a.: Mit ISDN ins multi–mediale Zeitalter. In: Elektronik 14, 1992, S. 34–37.
NL–Z: Willenstein, Ruud A.S..: ISDN–Schnittstelle der tk–Anlage SOPHO S fur gemischten Einsatz von herstell (List continued on next page.)

*Primary Examiner*—Benedict V. Safourek
*Attorney, Agent, or Firm*—Ware, Fressola, Van Der Sluys & Adolphson

[57] ABSTRACT

A device is provided for rapid data exchange between a telecommunications transmitter (T) and a data processor (PC), and includes a driver (TSV) and an intermediate line (FAST-LINK). The driver (TSV) is arranged between a terminal adapter (ADAPT) of the telecommunications transmitter (T) and an interface of the data processor (PC). The intermediate line (FAST-LINK) is arranged between the driver (TSV) and the data processor (PC). The telecommunications transmitter (T) is connected to a telecommunications network (ISDN) having a signalling channel and a user channel. The telecommunications transmitter (T) has an interface circuit (S) for adjusting transmission parameters between the telecommunications network (ISDN), the telecommunication transmitter (T) and the data processor (PC), has a first layer unit (1) for ensuring that data is transmitted in both directions on the signalling channel and the data channel, has a second layer unit (2) for assigning signalling channel data to the telecommunications transmitter (T) and to the data processor (PC), has a third layer unit (3) for identifying in the telecommunications transmitter (T) all the messages from a signalling activity (Call Reference) to differentiate which devices the user channel data should be assigned, and has an operating part (4) for entering keyboard inputs and a receiver for receiving acoustical inputs and providing acoustical outputs.

14 Claims, 2 Drawing Sheets

OTHER PUBLICATIONS erspezifischen und standardisierten End geraten. IN: Philips Telecommunication Review. Vo. 50, No. 2, S. 37–48.

DE–Z: N.J. ISDN–Controller auf Transputer–Basis In: Design&Elektronik, Aug. 6, v. 20. 3.1990, S–65–66.

NL–Z: HESDAHL, van der, P.B.: Digital ISDN Terminal Development. In: Philips Telecommunication Review, vol. 43, No. 3, Sep. 1990, S.2–10.

DE–Z: RIPP, Otmar: Software–Losung fur Europa–End–gerate. In: Funkschau, Feb./1992. S.60–63.

DE–ZL Hoflinger, J.: Leinweber, Walter H.: PConnect–Schnittstelle zwischen PC–und ISDN. IN: Philips Tele–Communication Review, vol. 50, No. 1, S. 18–24.

HEE, van de J.: PNT1: A Private NT1 to convertr the U–o–interface and vice versa. In: Philips Tele–Communication Review, vol. 49, No. 2, Jun. 1991. S–20-24.

METHOD AND APPARATUS FOR HIGH-SPEED DATA EXCHANGE

TECHNICAL FIELD

The invention concerns a process, a device and an interface circuit for the rapid exchange of data between a telecommunications transmitter and a data processor.

BACKGROUND OF THE INVENTION

A known process for the exchange of data between telecommunications and data processing systems, in the case where the telecommunications system provides "incoming service only" for the data processing system, takes place e.g. via the internationally standardized S2-interface with 2 MBit/s (PABX-Host-Coupling; "Computer Integrated Telephony (CIT)" (Computer inside the telephone line), Radio Show 16/1990, p. 55–58).

Another known process consists of converting data processors into "extra-feature-telephones" by means of corresponding software, so that both devices are combined in one data processor, for example a personal computer. In the event a second signalling channel is open, a so-called ISDN-B-Channel, a data link to another corresponding data processor is established, simultaneously with the voice service, which provides rapid transfer of data (ISDN-Terminals Experience Report; "The PC As An Extra-Feature-Telephone And More" Radio Show 26/1989, p. 31–34).

SUMMARY OF THE INVENTION

The invention has the task of developing a process, a device and an interface circuit, which makes a rapid data exchange possible between a telecommunications transmitter and a data processor.

The process-task is fulfilled by a fast data exchange between a telecommunications transmitter and a data processor, in which both signalling channel data and user channel data are transmitted by the time-division process through an interface circuit located in the telecommunications transmitter, where a layer-3 unit in the telecommunications transmitter identifies all the messages from a signalling activity (Call Reference), and makes it possible to differentiate to which of the devices the user channel data should be assigned, and where a layer-2 unit assigns the channel data to the telecommunications transmitter or to the data processor for processing, and where the transmission parameters are adjusted by the interface circuit. The device-task is fulfilled by a device for rapid data exchange between a telecommunications transmitter and a data processor, which contains an intermediate line with a driver between a terminal adapter of the telecommunications transmitter and a serial or parallel interface of the data processor, where the telecommunications transmitter contains an interface circuit, a layer-1 unit, a layer-2 unit, a layer-3 unit and an operating part, and where the telecommunications transmitter is connected to a telecommunications network. It is also fulfilled by an interface circuit for rapid data exchange between a telecommunications transmitter and a data processor, which is composed of a processor, a non-volatile memory, and means to switch on a power supply.

An advantage of the invention consists in that a high data throughput rate can be achieved with the claimed process, the device and with the aid of the claimed interface circuit. This makes it possible to simultaneously transmit and control several signalling channels and user channels. Furthermore, it also means that data transmission and voice transmission can take place simultaneously.

Another advantage is particularly found in the simultaneous transmission of data and voice. In the event that data are transmitted to or from a data processor, there is still the possibility of using the telecommunications transmitter. This is mandatory, since it makes possible, e.g. during an emergency, to place an emergency call to a user through a telecommunications transmitter, e.g. an ISDN-telephone, even though data is already being transmitted.

The transmission between interface circuit and data processor can take place via an intermediate line, by means of a corresponding driver.

A connection message, or so-called SET UP, can be transmitted to both the telecommunications transmitter and the data processor when incoming calls or data arrive. A connection is established when the SET UP arrives, the devices are therefore ready to receive. In addition, prior to the readiness for receiving, a voltage is switched on for the data processor, since the latter is turned off for reasons of economy when no transmission takes place, and is only switched on when a transmission is present.

The data processor can be programmed in such a way that only special calls or dam can be passed on when a communication message, a so-called ASSIGN, is received. These calls or data are previously established and programmed, so that a SET UP is only transmitted to the data processor for one of these special messages, and no SET UP is transmitted for the other calls or data.

In the event the data processor establishes a connection through the interface circuit, the signalling channel data can be directly transmitted through the connection (FAST-LINK). The result is a direct rapid data transmission, without any processing of the signalling channel data.

A password, and therefore the access authorization, can be checked in the event a connection (FAST-LINK) needs to be established to the data processor. A caller enters a number combination by means of a keyboard, which is passed on to the interface circuit in the form of multiple-frequency signals. There, the password is compared with access-authorized passwords, which are programmed and stored in the interface circuit. If they coincide, the connection (FAST-LINK) to the data processor is made available and established, and the voltage is switched on.

In the instance of checking the password and the access authorization, the existing data which the caller wants to transmit, are temporarily stored and transmitted when the access is authorized.

The interface circuit can adjust the data rate of the terminal adapter of the telecommunications transmitter to the serial interface or to the parallel interface of the data processor.

For example, in the event the telecommunications transmitter is an ISDN-terminal, such an adjustment takes place from a synchronous 64 kBd of the ISDN-terminal, to an asynchronous 115 kBd of the data processor. Other configurations can also be used.

The interface circuit can also be integrated into the telecommunications transmitter, or built as a separate device, a so-called Stand-Alone-Terminal.

BRIEF DESCRIPTION OF THE DRAWINGS

The process, the device and the interface circuit according to the invention are explained with the FIG. 1, which shows:

a block diagram of a device according to the present invention by means of which the process according to the

3 present invention is carried out.

Figure 1:
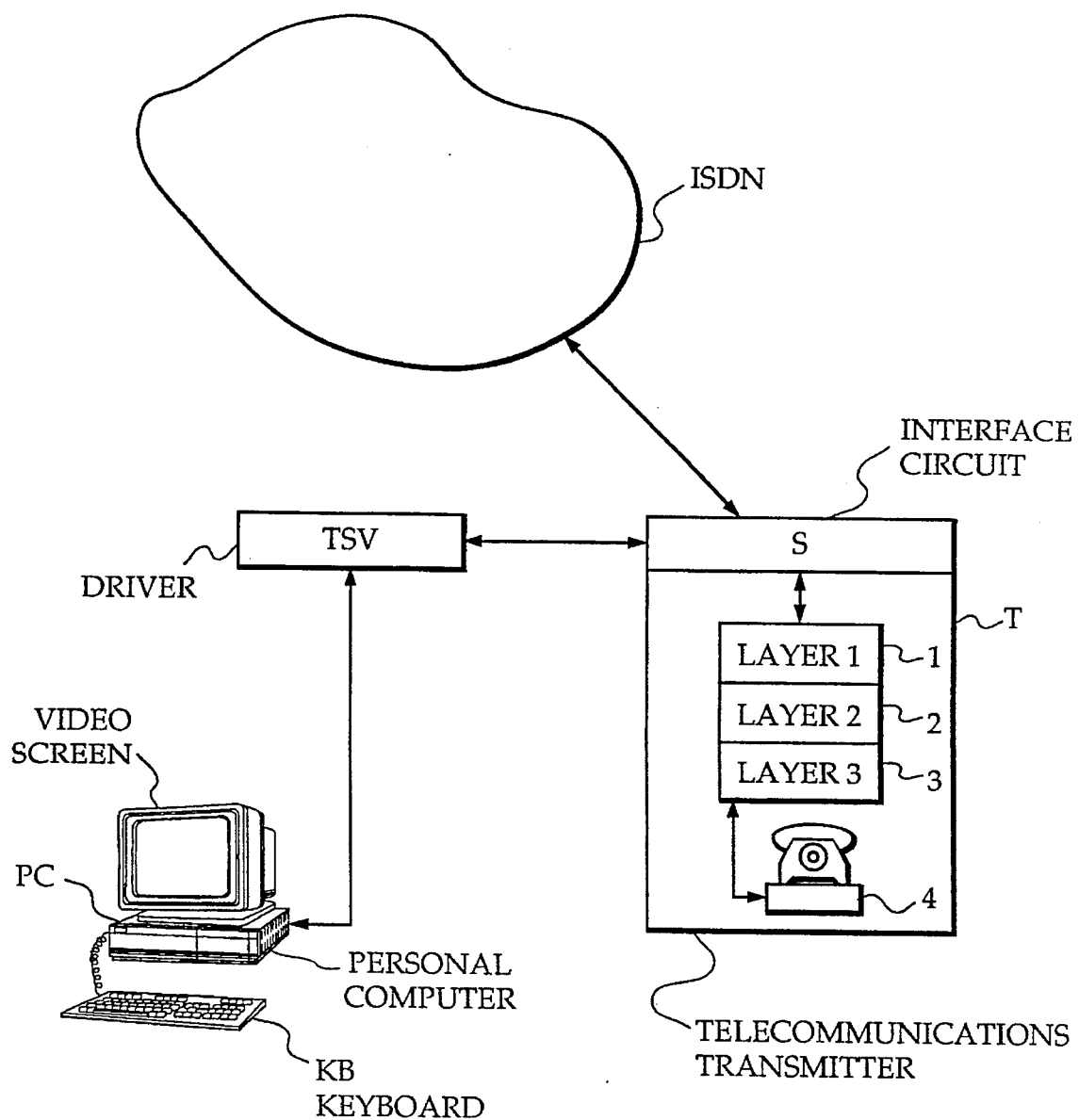
Figure 2:
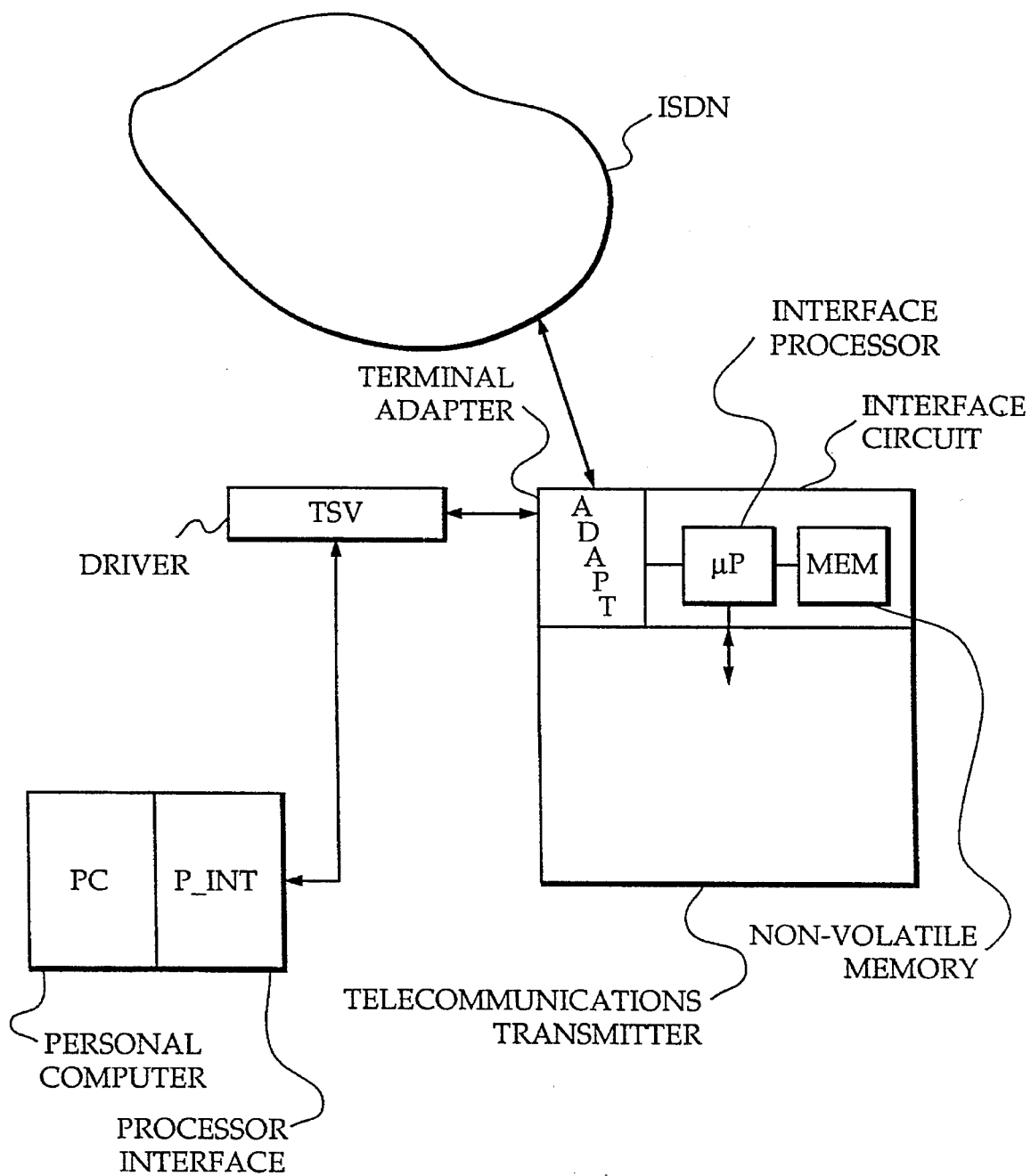

FIG. 2 shows a block diagram of an interface circuit S in FIG. 1.

BEST MODE FOR CARRYING OUT THE INVENTION

The following explains the process according to the invention.

As shown in FIG. 1, an interface circuit S located in a telecommunications transmitter T, which is connected to a telecommunications network ISDN, transmits both signalling channel data and user channel data by means of a time-division process. The interface circuit S is additionally connected to a data processor PC.

In the depicted configuration example, the telecommunications transmitter T, for example, is an ISDN- (Integrated Services Digital Network) terminal, such as e.g. an ISDN-telephone. Accordingly, the signalling channel data are ISDN-B-channel data and the user channel dam correspond to ISDN-D-channel data. The telecommunications network is respectively an ISDN-network.

The ISDN-terminal T, for example the ISDN-telephone, contains a layer-3 unit 3, which identifies all signalling activities with a so-called call-reference, and makes it possible to differentiate to which device the ISDN-D-channel data should be assigned. In addition, the ISDN-telephone contains a layer-2 unit 2, a layer-1 unit 1 and an operating part 4. The layer-2 unit 2 assigns the ISDN-channel data to one of the devices. The layer-1 unit 1 ensures that the data are transmitted in both directions in the channels. The operating part, for example, consists of a keyboard for entering numbers and a receiver for acoustic input and output.

Since the devices always operate at different data rates, the different transmission or bit rates must also be adjusted by the interface circuit S. For example, such an adjustment of the data rate is from a synchronous 64 kBd of the ISDN-telephone to an asynchronous 155 kBd of the data processor.

The transmission of data to or from the data processor takes place via a special intermediate FAST-LINK line. This special intermediate line makes the rapid data exchange possible. To transmit data through this intermediate line, an additional special driver TSV must be provided for this "rapid" intermediate FAST-LINK line, and placed in operation.

The following explains the device according to the invention.

The interface circuit according to the invention is integrated into the telecommunications transmitter T, for example. The interface circuit is located between the telecommunications network ISDN and the data processor PC, connected by the intermediate FAST-LINK line and the driver TSV. The channel data is transmitted to and/or from the data processor (PC) and the driver (TSV) through an intermediate link (FAST-LINK) between the telecommunications transmitter (T) and the data processor (PC). A terminal adapter is particularly used for the connections in the telecommunications transmitter. In the data processor, the parallel interface, e.g. the printer interface, or the serial interface can be used for connection of the intermediate line.

Another possibility is to build the interface circuit as a so-called "Stand-Alone-Terminal", outside of the telecommunications transmitter.

4

The following explains the interface circuit S for a device for rapid data exchange between a telecommunications transmitter and a data processor, which contains an intermediate line with a driver between a terminal adapter of the telecommunications transmitter and a serial or parallel interface of the data processor, where the telecommunications transmitter contains an interface circuit, a layer-1 unit, a layer-2 unit, a layer-3 unit and an operating part, and where the telecommunications transmitter is connected to a telecommunications network.

As shown in FIG. 2, the interface circuit S contains a processor (NP), a non-volatile memory (MEM), and means (SW) to switch on a voltage for the data processor PC.

For example, the non-volatile memory is used for the read-only-memory storage of access authorization data. The means to switch on a voltage consists of electronics which recognize that a connection with the data processor must be established. In that instance, the voltage is switched on to the data processor PC, which makes it ready to operate, i.e. ready to enter or retrieve data.

We claim:

1. A process for fast data exchange between a telecommunications transmitter (T) and a data processor (PC), comprising the steps of:

transmitting both signalling channel data and user channel data by a time-division process through an interface circuit (S) located in the telecommunications transmitter (T);

identifying with a layer-3 unit (3) in the telecommunications transmitter (T) all signalling activity with a call reference signal (Call Reference) in a message signal to determine whether the user channel data should be assigned to the data processor PC or to the telecommunications transmitter (T);

assigning with a layer-2 unit (2) the signalling channel data to the telecommunications transmitter (T) or to the data processor (PC); and adjusting transmission parameters with the interface circuit (S).

2. A process as recited in claim 1, further comprising the step of transmitting channel data to and/or from the data processor (PC) with a drive (TSV) through an intermediate line (FAST-LINK) between the telecommunications transmitter (T) and the data processor (PC).

3. A process as recited in claim 2, further comprising the step of transmitting a connection message (SET UP) to both the telecommunications transmitter (T) and the data processor (PC) when incoming calls or data arrive, and a voltage is switched on for the data processor (PC).

4. A process as recited in claim 2, further comprising the step of programming the data processor (PC) in such a way that only connection messages (SET UP) from established applications are transmitted with a message of a communication (ASSIGN).

5. A process as recited in claim 2, further comprising the step of transmitting directly signalling channel data via the intermediate line (FAST-LINK) when a connection is established from the data processor through the interface circuit (S).

6. A process as recited in claim 2, further comprising the steps of: requesting a password and an access authorization from a caller in the event of an incoming call, entering the password in the form of a number combination, comparing the password with access-authorized passwords that are programmed and stored in the interface circuit (S), and if they coincide, establishing a connection to the data processor (PC) via the intermediate line (FAST-LINK), and switching the power on for the data processor (PC).

7. A process as recited in claim 1, further comprising the step of storing temporarily the incoming data in the event access to the data processor (PC) is delayed.

8. A device for rapid data exchange between a telecommunications transmitter (T) and a data processor (PC), comprising:

a driver (TSV) arranged between a terminal adapter (ADAPT) of the telecommunications transmitter (T) and a processor interface circuit (P-INT) of the data processor (PC);

an intermediate line (FAST-LINK) arranged between the driver (TSV) and the data processor (PC);

the telecommunications transmitter (T) being connected to a telecommunications network (ISDN) with a signalling channel and a user channel, having an interface (S) for adjusting transmission parameters between the telecommunications network (ISDN), the telecommunications transmitter (T) and the data processor (PC), having a layer-1 unit (1) for ensuring that data is transmitted in both directions on the signalling channel and the data channel, having a layer-2 unit (2) for assigning signalling channel data to either the telecommunications transmitter (T) or to the data processor (PC), having a layer-3 unit (3) for identifying in the telecommunications transmitter (T) all signalling activity with a call reference signal (Call Reference) in a message signal to determine whether the user channel data should be assigned to the data processor PC or to the telecommunications transmitter (T), and having an operating part (4) for entering keyboard inputs and a receiver for receiving acoustical input signals and providing acoustical output signals.

9. A device according to claim 8, wherein the interface circuit (S) comprises an interface processor (μP) and a non-volatile memory (MEM).

10. A device according to claim 9, wherein the interface circuit adjusts the data rate of the terminal adapter (ADAPT) of the telecommunications transmitter (T) to a serial or parallel interface of the data processor (PC).

11. A device according to claim 10, wherein the interface circuit (S) is integrated into the telecommunications transmitter (T).

12. A process as in claim 1, whereby a connection message (SET UP) is transmitted to both the telecommunications transmitter (T) and the data processor (PC) when incoming calls or data arrive, and a voltage is switched on for the data processor.

13. A process as in claim 1, whereby the data processor is programmed in such a way, that only connection messages (SET UP) from established applications are transmitted with a message of a communication (ASSIGN).

14. A device according to claim 9, wherein the interface circuit (S) is integrated into the telecommunications transmitter (T).

* * * * *